United States Patent [19]

Muller

[11] 3,826,543

[45] July 30, 1974

[54] TRACK TENSIONING AND RECOIL APPARATUS

[75] Inventor: Thomas P. Muller, Aurora, Ill.

[73] Assignee: Caterpillar Tractor Co., Peoria, Ill.

[22] Filed: Oct. 13, 1972

[21] Appl. No.: 297,196

[52] U.S. Cl. .................................. 305/10, 92/63
[51] Int. Cl. .......................................... B62d 55/30
[58] Field of Search .................. 305/10; 92/75, 63

[56] References Cited
UNITED STATES PATENTS

| | | | |
|---|---|---|---|
| 2,614,536 | 10/1952 | Livers | 92/63 |
| 2,683,064 | 7/1954 | Land | 305/10 |
| 2,697,641 | 3/1956 | Henderson | 305/10 |
| 2,818,311 | 12/1957 | Ashley | 305/10 |
| 2,887,342 | 5/1959 | Helsel | 305/10 |
| 2,959,451 | 11/1960 | Weber | 305/10 |
| 3,332,725 | 7/1967 | Reinsma | 305/10 |
| 3,692,368 | 9/1972 | Alexander | 305/10 |

Primary Examiner—Robert S. Ward, Jr.
Assistant Examiner—Reinhard J. Eisenzopf
Attorney, Agent, or Firm—Phillips, Moore, Weissenberger, Lempio & Strabala

[57] ABSTRACT

A track tensioning and recoil system is used in a vehicle having a track frame, front and rear rotatable members associated therewith, and a track entrained thereabout. The system includes a cylinder and piston combination which defines a chamber into which is pumped pressurized grease or the like. The piston, upon movement thereof due to the introduction of such pressurized grease, urges a push rod separate from the piston and connected to the front rotatable member to move the front rotatable member away from the rear rotatable member to tension the track. The cylinder is associated with the rear rotatable member by means of a recoil spring which allows recoil of the first rotatable member toward the second rotatable member against the biasing force thereof.

12 Claims, 3 Drawing Figures

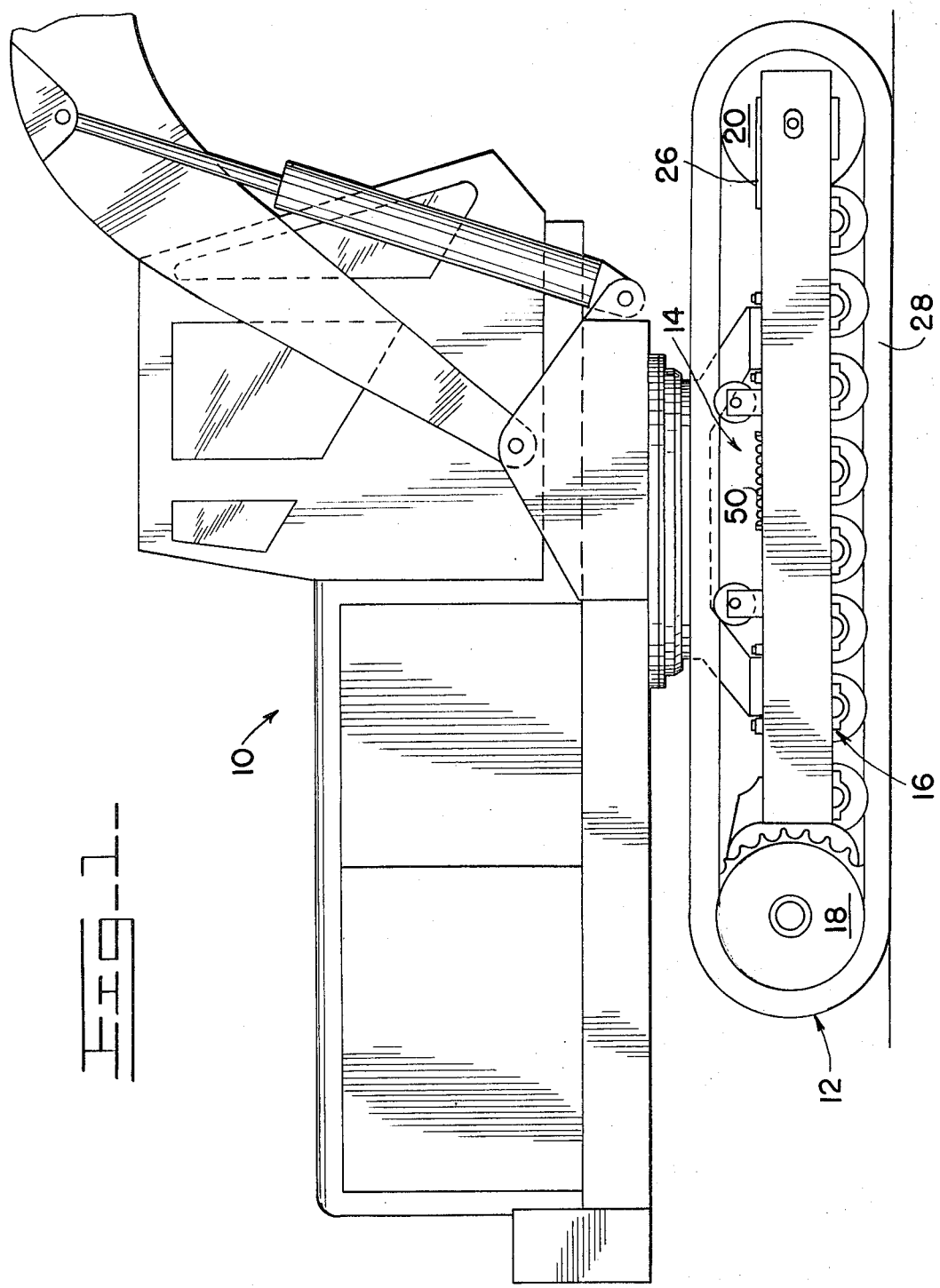

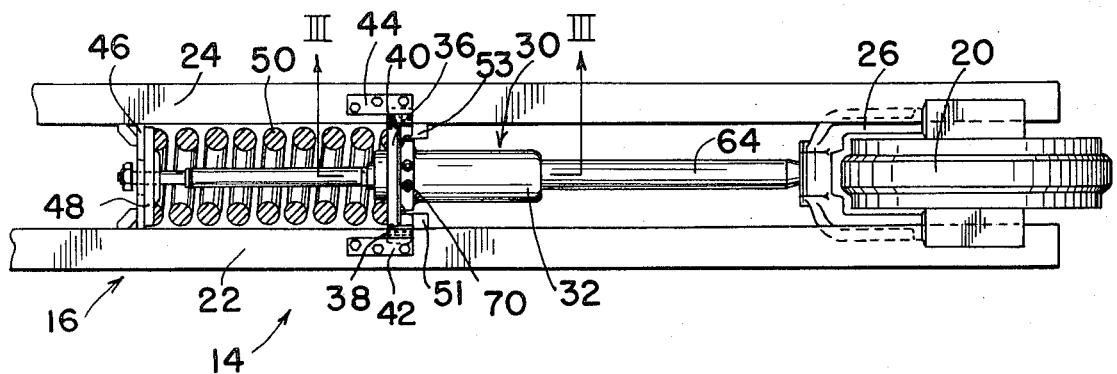
Fig_2_
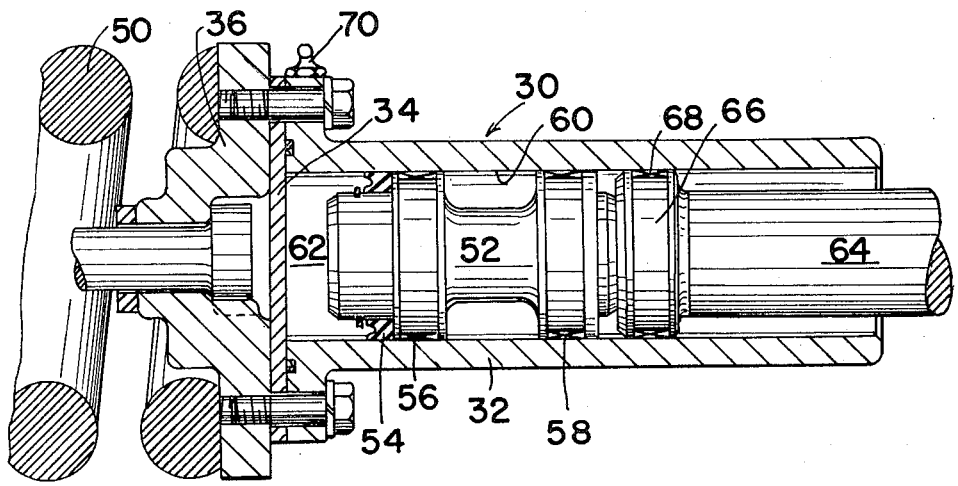
Fig_3_

TRACK TENSIONING AND RECOIL APPARATUS

BACKGROUND OF THE INVENTION

This invention relates to track tensioning and recoil systems, and more particularly, to such a system which utilizes a cylinder and piston combination for track tensioning and a resilient spring for recoil.

In track type vehicles, it is well known to provide movement of a front idler toward and away from a rear drive member so that (i) the track entrained thereabout may be properly tensioned between the front idler and rear drive member, and/or (ii) recoil of the front idler may be allowed. Examples of such systems are shown in U.S. Pat. No. 2,959,451 to Weber, U.S. Pat. No. 2,887,342 to Helsel, U.S. Pat. No. 2,683,064 to Land, Re. No. 24,126 to Henderson, and U.S. Pat. No. 2,818,311 to Ashley. Generally, such systems incorporate a cylinder and piston combination and associated structure for tensioning the track. The cylinder and piston together define a chamber into which is pumped pressurized fluid, the introduction of such fluid moving the piston within the cylinder to thus move the front idler away from the rear drive member, to thereby tension the track. Such systems (i.e. U.S. Pat. No. 2,959,451 to Weber, U.S. Pat. No. 2,887,342 to Helsel, U.S. Pat. No. 2,683,064 to Land, and Re. No. 24,126 to Henderson) generally have the disadvantage that either the cylinder or piston thereof is directly connected to the front idler, resulting in sealing and wear problems between the piston and cylinder. In the case of U.S. Pat. No. 2,818,311 to Ashley, while great side loads are not placed on the piston or cylinder thereof, separate guide means for the push rod thereof have been incorporated, resulting in relatively great complexity of design.

In combination with proper tensioning means, it is of course desirable to incorporate a properly functioning recoil system. In addition, the entire system should be simple and efficient.

SUMMARY OF THE INVENTION

It is therefore an object of this invention to provide in a track type vehicle a track tensioning system in which the cylinder and piston combination thereof is not subject to great side loads.

It is a further object of this invention to provide in a track type vehicle a track tensioning system which, while fulfilling the above object, provides simple guide means for the means interconnecting the tensioning idler with the piston and cylinder combination.

It is a still further object of this invention to provide in a track type vehicle a recoil system in combination with the above.

It is a still further object of this invention to provide in a track type vehicle a tensioning and recoil system which is simple in design and efficient in operation, lending itself to ease of manufacture.

Broadly stated, the invention is in a vehicle having first and second rotatable members and a track entrained thereabout, with the first and second rotatable members being relatively movable toward and away from each other. The invention comprises track tensioning apparatus comprising a cylinder associated with the first rotatable member and having a cylinder wall and a head portion. A piston is disposed within the cylinder and defines with the cylinder wall and head portion a chamber. A push rod, separate from the piston, is associated with the second rotatable member to move therewith, and has the extended end thereof disposed within the cylinder. Means are included for introducing pressurized fluid into the chamber to move the piston into contact with the extended end of the push rod to force the cylinder and push rod apart to extend the push rod from the cylinder. Means are included for transmitting the force on the cylinder forcing the cylinder and push rod apart to the first rotatable member, whereby introduction of such pressurized fluid extends the push rod from the cylinder to provide relative movement of the first and second rotatable members away from each other to thereby tension the track.

BRIEF DESCRIPTION OF THE DRAWINGS

These and other objects of the invention will become apparent from a study of the following specification and drawings, in which:

FIG. 1 is a side elevation of a vehicle incorporating the inventive system;

FIG. 2 is a plan view of the system of FIG. 1; and,

FIG. 3 is a sectional view taken along the line III-III of FIG. 2.

DESCRIPTION OF THE PREFERRED EMBODIMENT

Shown generally in FIG. 1 is a hydraulic excavator vehicle 10 having track assemblies on either side thereof, one of which is shown at 12. The vehicle 10 incorporates therein the present inventive track tensioning and recoil apparatus 14. The track assembly 12 includes a track frame 16 having rotatable members 18, 20 associated therewith. Rotatable member 18 is actually a drive sprocket mounted to the rear portion of the track frame 16. Such drive sprocket 18 is driven by an engine (not shown) which is part of the vehicle 10.

As shown in FIG. 2, the track frame 16 actually comprises a pair of longitudinal spaced rails 22, 24 on which is slidably mounted a yoke 26. Front rotatable member 20, in this embodiment an idler, is mounted to the yoke 26 and is associated with the track frame 16 through such yoke 26. Upon sliding of the yoke 26 it will be seen that the idler 20 is movable toward and away from the drive sprocket 18, (i.e., the idler 20 and drive sprocket 18 are relatively movable toward and away from each other). A track 28 is entrained about the drive sprocket 18 and idler 20 as is well known.

A cylinder 30 is associated with the drive sprocket 18 and idler 20 as now described. Cylinder 30 is made up of a cylindrical body portion 32 and a separate head portion 34 fixed thereto by means of an overlying adapter plate 36. This adapter plate 36 has a pair of outwardly extending arms 38, 40 slidable along the rails 22, 24 respectively and retained thereon by guide members 42, 44 secured to the rails 22, 24. Between rails 22, 24 rearwardly of the cylinder 30 is a plate 46. Disposed between the plate 46 and the cylinder 30, actually bearing on adapter plate 36 and a pad 48 in contact with plate 46, is a helical spring 50.

Stop blocks 51, 53 are fixed to the rails 22, 24 to limit forward movement of the cylinder 30 under the resiliency of the spring 50. A piston 52 is disposed within the cylinder 30, and includes a seal 54 and wear rings 56, 58 in engagement with the cylinder wall 60 and defining with the cylinder wall 60 and head portion 34 a chamber 62.

A push rod 64 is fixed to yoke 26 and extends rearwardly therefrom to move therewith toward and away from the drive sprocket 18. The push rod 64 has the extended end 66 thereof disposed within the cylinder 30, but is separate from the piston 52. Wear ring 68 is included on end 66 and is in engagement with the cylinder wall 60.

To properly tension the track 28, means are included for introducing pressurized fluid, in this embodiment substantially incompressible grease, through a fitting 70 and into chamber 62 to move piston 52 into contact with the extended end 66 of push rod 64. Such pressurized grease forces the cylinder 30 and push rod 64 apart to extend the push rod 64 from the cylinder 30. The helical spring 50 transmits force from the cylinder 30 rearwardly to the plate 46, to the track frame 16, so that introduction of such pressurized grease extends the push rod 64 from the cylinder 30 to move the idler 20 away from the drive sprocket 18 (i.e., to provide relative movement of the drive sprocket 18 and idler 20 away from each other) to thereby tension the track 28. This is actually done, it will be seen, by the transmission of force from the helical spring 50 through the cylinder 30, the grease in the chamber 62, the piston 52, and the push rod 64.

It will also be seen that the idler 20 may be moved toward the drive sprocket 18 against the resiliency of helical spring 50 (i.e., relative movement of the idler 20 and drive sprocket 18 toward each other is allowed against the resiliency of the helical spring 50). Meanwhile, the idler 20 is generally urged away from the drive sprocket 18 by such helical spring 50 (i.e., the idler 20 and drive sprocket 18 are urged away from each other by the spring 50). It is understood, of course, that fitting 70 contains a check valve (not shown) for maintaining pressure within the chamber 62, as is well known.

The means disclosed function to take up the slack of the track 28 as wear occurs in the pins and bushing of the track 28. As set out above, this is accomplished by pumping pressurized grease into the chamber 62, forcing the piston 52, push rod 64, and idler 20 to the right, as viewed in FIG. 1, to maintain proper tension in the track 28.

During operation of the excavator 10, should the track 28 encounter an obstruction, or an object become lodged between the track 28 and the idler 20 and/or sprocket 18, the idler 20, push rod 64, piston 52, the grease in chamber 62, and cylinder 30 will be forced rearwardly against the bias of the spring 50. The grease in the chamber 62, being substantially incompressible, acts substantially as a solid link, and the rearward movement of the idler 20 compresses the spring 50. When the object is dislodged from the track 28, expansion of the compressed spring 50 forces the push rod 64 and idler forwardly to their original positions.

It is to again be noted that the end 66 of the push rod 64 abuts against the piston 52 with the wear ring 68 functioning as a bearing so that the push rod 66 in its movement is guided by the cylinder 30. Thus, proper and simple guide means are provided for the end 66 of push rod 64. In addition, piston 52 is not subjected to the side loads imposed on the push rod 64 by external forces, resulting in proper sealing and less wear between piston 52 and cylinder wall 60 over a long period of time. Further, the piston 52 can be preassembled within the cylinder 30, meaning that the seal 52 and the wear rings 56, 58 thereon are less susceptible to damage during assembly.

The use of plate 34 as a separate part in cylinder 30 means that the cylinder 30 may be constructed of separate components which may be manufactured relatively simple without the need for making of a complex single cylinder body.

I claim:

1. In a vehicle having first and second rotatable members and a track entrained thereabout, with the first and second rotatable members being relatively movable toward and away from each other, track tensioning apparatus comprising:

a a cylinder associated with the first rotatable member and having a cylinder wall and a head portion;

b a piston disposed within the cylinder and defining with the cylinder wall and head portion a chamber;

c a push rod separate from the piston and associated with the second rotatable member to move therewith, and having the extended end thereof disposed within the cylinder;

d means for introducing pressurized fluid into the chamber to move the piston into contact with the extended end of the push rod to force the cylinder and push rod apart to extend the push rod from the cylinder; and, e means for transmitting the force on the cylinder forcing the cylinder and push rod apart to the first rotatable member, whereby introduction of such pressurized fluid extends the push rod from the cylinder to provide relative movement of the first and second rotatable members away from each other to thereby tension the track.

2. The track tensioning apparatus of claim 1 wherein the force transmitting means comprise resilient means for allowing movement of the first and second rotatable members toward each other against the resiliency thereof, meanwhile urging the first and second rotatable members away from each other.

3. The track tensioning apparatus of claim 2 wherein the cylinder comprises a cylindrical body portion and a separate head portion fixed thereto.

4. The track tensioning apparatus of claim 3 wherein the fluid is substantially incompressible.

5. The track tensioning apparatus of claim 1 wherein the push rod is guided in its movement by the cylinder.

6. In a vehicle having a track frame, a first rotatable member mounted to the track frame, and a second rotatable member associated with the track frame and movable toward and away from the first rotatable member, and a track entrained about the first and second rotatable members, track tensioning apparatus comprising:

a a cylinder associated with the first rotatable member and having a cylinder wall and a cylinder head portion;

b a piston disposed within the cylinder and defining with the cylinder wall and head portion a chamber;

c a push rod separate from the piston and associated with the second rotatable member to move therewith toward and away from the first rotatable member, and extending rearwardly of the second rotatable member and having the extended end thereof disposed within the cylinder;

d means for introducing pressurized fluid into the chamber to move the piston into contact with the push rod to force the cylinder and push rod apart to extend the push rod from the cylinder; and, e means for transmitting the force on the cylinder forcing the cylinder and push rod apart to the first rotatable member, whereby introduction of such pressurized fluid extends the push rod from the cylinder to move the first rotatable member away from the second rotatable member to thereby tension the track.

7. The track tensioning apparatus of claim 6 wherein the cylinder comprises a cylindrical body portion and a separate head portion fixed thereto.

8. The track tensioning apparatus of claim 7 wherein the force transmitting means comprise resilient means for allowing movement of the first rotatable member toward the second rotatable member against the resiliency thereof, meanwhile urging the second rotatable member away from the first rotatable member.

9. The track tensioning apparatus of claim 8 wherein the force transmitting means further comprise plate means fixed to the track frame, with the resilient means comprising a helical spring disposed between the fixed plates and cylinder, so that the helical spring urges the second rotatable member away from the first rotatable member through the cylinder, the fluid in the chamber, the piston, and the push rod.

10. The track tensioning apparatus of claim 9 wherein the fluid is substantially incompressible.

11. The track tensioning apparatus of claim 10 wherein the second rotatable member is an idler.

12. The track tensioning apparatus of claim 6 wherein the push rod is guided in its movement by the cylinder.

* * * * *